(12) United States Patent
Youngquist (10) Patent No.: US 7,054,760 B2
(45) Date of Patent: May 30, 2006

(54) APPARATUS AND METHOD FOR GENERATING AND DISPLAYING FUEL FLOW INFORMATION IN A GPS-EQUIPPED VEHICLE

(76) Inventor: John S. Youngquist, 899 Niagra Parkway, Fort Erie, Ontario (CA) L2A 5M4

( * ) Notice: Subject to any disclaimer, the term of this patent is extended or adjusted under 35 U.S.C. 154(b) by 0 days.

(21) Appl. No.: 10/385,568

(22) Filed: Mar. 12, 2003

(65) Prior Publication Data
US 2004/0181358 A1 Sep. 16, 2004

(51) Int. Cl.
*G06F 13/10* (2006.01)

(52) U.S. Cl. ............... 702/33; 702/45; 702/50; 702/57

(58) Field of Classification Search .......... 702/30, 702/33, 43, 45, 50, 57, 100, 105, 123; 60/276; 123/494; 700/241; 701/123
See application file for complete search history.

(56) References Cited

U.S. PATENT DOCUMENTS

| | | | |
|---|---|---|---|
| 3,908,451 A | 9/1975 | Walker et al. | 73/114 |
| 4,050,295 A | 9/1977 | Harvey | 73/114 |
| 4,218,744 A * | 8/1980 | Pratt et al. | 701/123 |
| 4,296,472 A | 10/1981 | Sarkis | 364/509 |
| 4,400,779 A | 8/1983 | Kosuge et al. | 364/442 |
| 4,611,287 A * | 9/1986 | Kobayashi et al. | 701/123 |
| 6,151,549 A | 11/2000 | Andrews et al. | 701/115 |
| 6,195,604 B1 | 2/2001 | Moore et al. | 701/50 |
| 6,275,231 B1 | 8/2001 | Obradovich | 345/349 |
| 6,510,842 B1 * | 1/2003 | Ismailov | 123/494 |
| 6,611,755 B1 * | 8/2003 | Coffee et al. | 701/213 |
| 6,738,697 B1 * | 5/2004 | Breed | 701/29 |
| 2005/0192727 A1 * | 9/2005 | Shostak et al. | 701/37 |

* cited by examiner

*Primary Examiner*—Marc S. Hoff
*Assistant Examiner*—Felix Suarez
(74) *Attorney, Agent, or Firm*—Nixon & Vanderhye P.C.

(57) ABSTRACT

Fuel flow information is generated in an engine compartment and transmitted for display on the fuel page(s) of a GPS signal receiver located in view of a vehicle operator. A fuel transducer coupled to a pre-programmed micro-controller are provided as an integrated single unit in the engine compartment of the vehicle (e.g., an aircraft). The integrated transducer/micro-controller unit outputs RS232 fuel flow signals to the GPS signal receiver without requiring any extra panel space. Since the transducer/micro-controller is already pre-programmed to compensate for the proportionality or "K" factor, no further calibration or compensation programming is needed at installation time (or when one composite transducer/computer unit is substituted for another). Separate transducer/micro-controller power supply and grounding connections suppress common mode noise. A blinking LED power/fuel flow visual display on the unit in the engine compartment helps trouble shoot power and/or transducer problems.

43 Claims, 5 Drawing Sheets

APPARATUS AND METHOD FOR GENERATING AND DISPLAYING FUEL FLOW INFORMATION IN A GPS-EQUIPPED VEHICLE

FIELD OF THE INVENTION

This invention relates to apparatus and method for generating vehicular engine fuel flow data suitable for supply to a GPS-receiver for display to a vehicle operator (e.g., the pilot or co-pilot of an aircraft).

BACKGROUND OF THE INVENTION

The following prior art issued U.S. patents are examples of prior art fuel flow measuring systems for various types of vehicles:

U.S. Pat. No. 6,275,231—Obradovich (2001)
U.S. Pat. No. 6,195,604—Moore et al (2001)
U.S. Pat. No. 6,151,549—Andrews et al (2000)
U.S. Pat. No. 4,400,779—Kosuge et al (1983)
U.S. Pat. No. 4,296,472—Sarkis (1981)
U.S. Pat. No. 4,218,744—Pratt et al (1980)
U.S. Pat. No. 4,050,295—Harvey (1977)
U.S. Pat. No. 3,908,451—Walker et al (1975)

Walker et al., Harvey, Pratt et al., Sarkis and Kosuge et al. are representative of prior art dealing with various fuel flow measuring systems. None of these patents discloses a system that interfaces with a vehicle GPS signal receiver, although the Pratt et al. patent uses a Flow Scan model 201 transducer.

Andrews et al, Moore et al and Obradovich disclose systems that utilize both fuel transducers/sensors and GPS signal receivers. Andrews et al discloses a truck fuel control system that adjusts fuel flow on the basis of the truck's elevation, as determined by the GPS signal receiver. Moore et al discloses a tractor monitoring system, which incorporates a GPS signal receiver for plotting a yield map showing the amount of grain harvested in a given area. Obradovich discloses a management system for an automobile, which includes a GPS signal receiver for an associated navigation system.

There are also fuel flow monitoring systems for aircraft that generate fuel flow data for input to an existing GPS "fuel page" display. For example, fuel flow computer and display systems are available from Insight Instrument Corporation, from JP Instruments, Inc. and from Shadin, Inc. However such prior systems include a transducer mounted in the engine compartment and a separate cabin panel mounted computer and display. The separately installed computer/display requires programming upon installation to accommodate the proportionality or "K" factor of the particular installed transducer and, of course, requires its own panel space—even though the same fuel flow data may be passed on to the GPS receiver for display there as well.

SUMMARY OF THE INVENTION

The present invention is directed to a simplified, less expensive, fuel flow data generating method/apparatus for use in conjunction with a GPS signal receiver. The exemplary simplified fuel flow system includes a micro-controller and fuel flow transducer co-located in a common installation housing in the engine compartment. The micro-controller is disposed in the engine compartment (between the flow transducer and the cabin panel mounted GPS signal receiver) to perform fuel flow calculations, including pre-programmed "K" factor compensation for the particular transducer co-packaged therewith. The resulting fuel flow data is displayed on the "fuel flow" page(s) of the GPS signal receiver—without requiring any extra panel space.

In operation, a user need only turn on the GPS receiver and enter the total fuel on board on the fuel page (if not previously entered), which is the typical procedure associated with many aircraft GPS signal receivers. Nearly instantly, fuel flow information will be produced and displayed on the fuel pages of the GPS signal receiver display. More particularly, the fuel flow transducer inputs raw incremental fuel flow measurement pulses to a co-located factory-programmed micro-controller that calculates calibrated fuel flow rate (and perhaps total fuel used or other fuel-related parameters). The calculated fuel flow data is then formatted and transmitted through the firewall to a serial data interface on the GPS receiver for display.

The transducer can be a conventional commercially available fuel sensor such as, for example, a Flowscan 201B fuel sensor. A commercially available GPS signal receiver can be used such as, for example, the Garmin 430/530.

By utilizing the fuel page(s) display of a suitable GPS signal receiver already located in a vehicle (e.g., the cockpit of an airplane), no additional display device or space need be provided to add clutter to the instrument panel.

The transducer and co-located micro-controller assembly in the vehicle engine compartment preferably includes an LED (light emitting diode) which indicates power supply while also flashing at a rate related to that of fuel flow output pulses from the transducer thus facilitating trouble shooting processes.

Simplified installation is facilitated by the single transducer/computer unit (e.g., on the engine, serially within an engine compartment fuel supply line and electrically to an RS232 data input of an existing GPS unit).

Separate power supply and grounding connections to the transducer and micro-controller, in conjunction with an isolating opto-coupler therebetween, also help suppress common mode noise and/or other "ground problems".

DETAILED DESCRIPTION OF EXEMPLARY EMBODIMENTS

Figure 1:
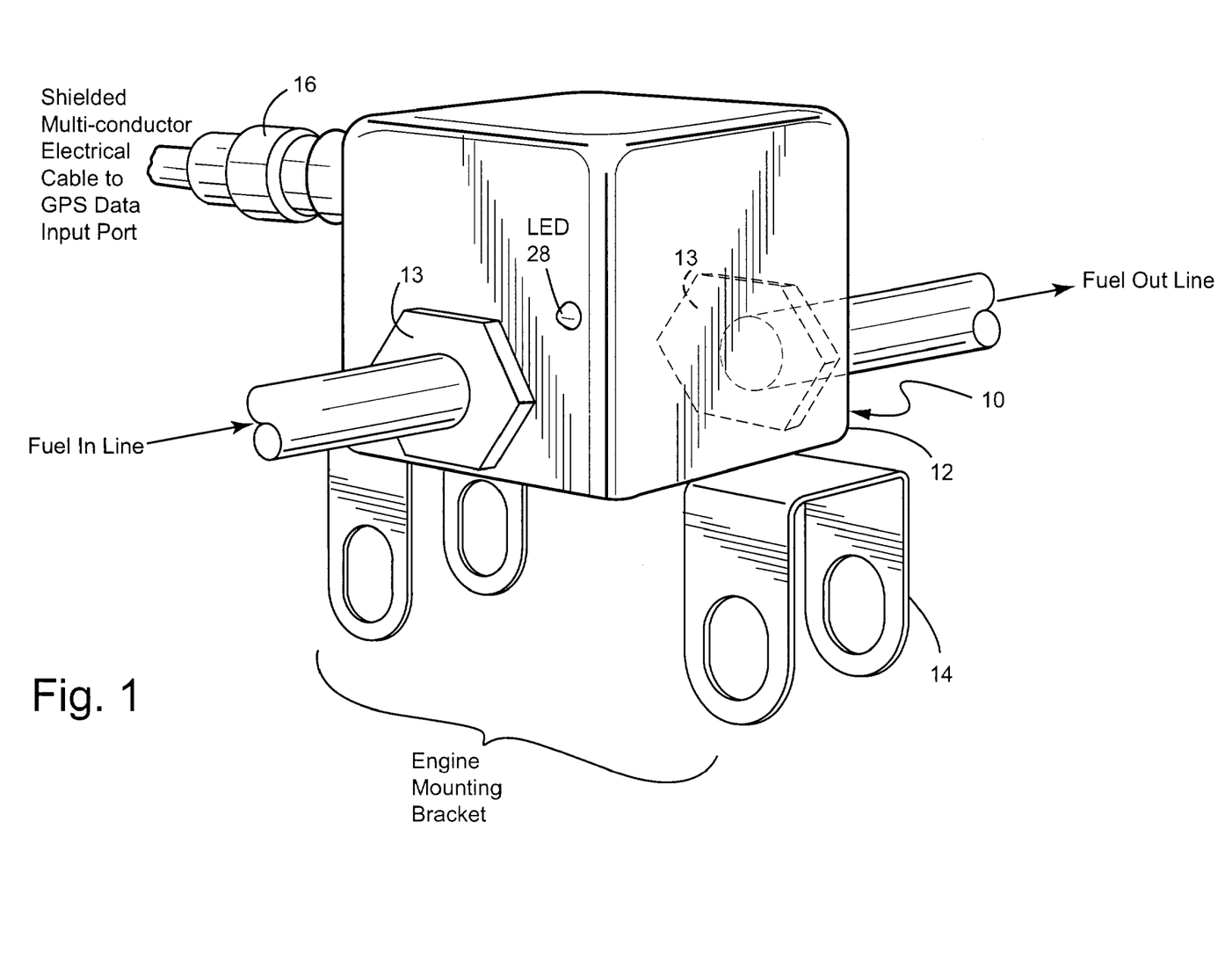
FIG. 1 depicts an exemplary embodiment of an integrated transducer/micro-controller engine-mounted assembly in accordance with this invention.

An exemplary integrated transducer/micro-controller engine mounted assembly 10 is shown in FIG. 1. A stainless steel housing 12 is affixed to and supported on engine mounting bracket 14. For example, such bracket may be adapted to mate with engine the juxtaposed engine casing flanges on top of a typical horizontal reciprocating piston aircraft engine (e.g., near the center of the engine where an injection fuel flow distributor is typically mounted). When so mounted, it will be relatively convenient to direct the total engine injection fuel flow into and out of housing 10 as shown (e.g., standard fuel line connectors 13). As also depicted, a shielded multi-conductor electrical cable connection 16 projects from the back side of housing 10 so that it can be conveniently routed to and through the firewall, into the cabin and connected to a conventional RS232 data input port of an existing GPS unit (and to the GPS or other suitable power source if electrical power is not available on a pin of the data port connector).

As shown in FIG. 1, LED 28 is visible to maintenance personnel when the engine cowling is opened. If the LED is lit, then it is known that the unit 10 is being supplied with electrical power (e.g., via the shield and a conductor of cable connection 16). The LED 28 is also configured to flash on and off at a rate related to fuel flow signals (e.g., incremental fuel flow pulses) output from the fuel flow transducer inside housing 10. Thus by causing fuel to flow (e.g., by activating a fuel pump and/or by starting the engine), the operator and/or maintenance personnel can tell whether the fuel flow transducer/computer is functioning.

Figure 2:
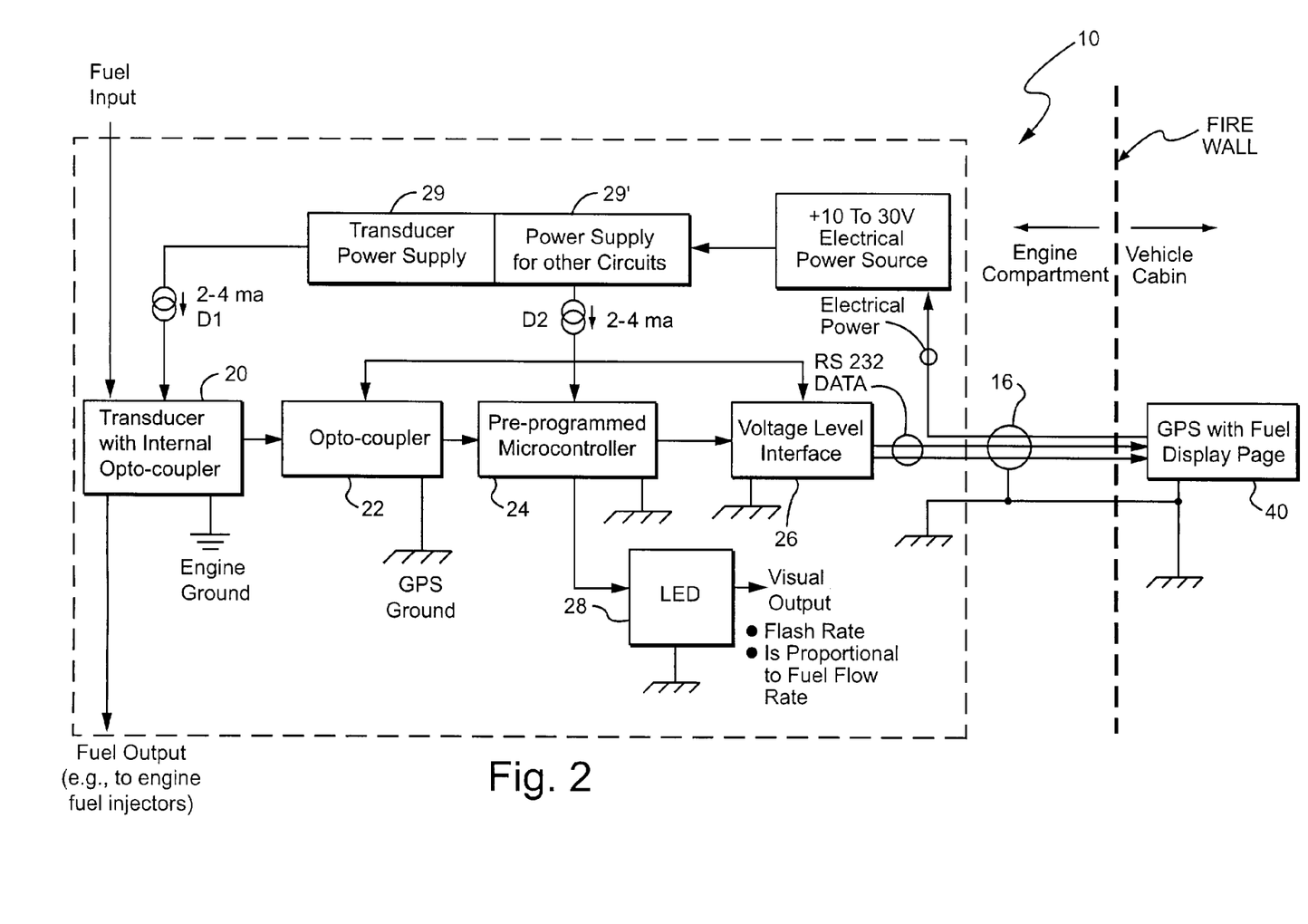
FIG. 2 is a block diagram of the assembly depicted in FIG. 1.

FIG. 2 shows in block diagram the transducer/micro-controller assembly components of the FIG. 1 exemplary embodiment. As shown in FIG. 2, fuel flow transducer 20 senses incremental amounts of fuel flow to a vehicle engine, (i.e., an airplane engine), and outputs a corresponding number of electrical signal pulses. Although transducer 20 may have its own internal opto-coupler, output pulses from transducer 20 are preferably connected through yet another isolating opto-coupler 22 to micro-controller 24. Micro-controller 24 outputs processed data signals through a voltage level changing interface 26 to the conventional serial data input port of GPS signal receiver 40, and to LED 28. A power supply 29/29' supplies separate operating power connections to (a) transducer 20, and (b) opto-coupler 22, micro-controller 24 and interface 26.

Transducer 20 may be of the type that causes fuel to turn an impeller mounted on jewel bearings. The impeller interrupts the infrared light beam of an internal slotted opto-coupler. The opto-coupler signal is then amplified to produce an open-collector output current pulse. Transducer 20 typically produces a pulse stream having a number of pulses linearly related to increments of fuel flow for flow rates down to 0.3 gallons per hour—without causing any appreciable fuel flow to the engine.

Alternatively, the fuel transducer may be based on other flow related phenomena (e.g., a pressure drop through an orifice, an ultrasonic-based transducer using Doppler effects, a heated probe induced temperature gradient, or any other known flow measurement technique) and/or output an analog signal related to sensed fuel flow. A conventional A/D converter could be used to provide corresponding digital signals related to measured flow.

By coupling the electrical output from transducer 20 into micro-controller 24 through yet another opto-coupler 22 (i.e., external to the flow transducer) and separating the electrical return paths (e.g., engine ground for transducer 20 and GPS ground for other circuits) and effectively using separate power supplies, the potentially deleterious effects of common-mode noise voltages can be reduced or virtually eliminated while also enhancing safety of the installation.

For example, common mode noise may appear superimposed on ground connections because of alternator problems or higher than normal ground wire resistances. Two current regulator/limiting diodes D1, D2 (e.g., gate-shorted FET's) respectively supply current limited regulated electrical power to transducer 20 (including its internal opto-coupler) and the remainder of the circuits. They regulate the current for the open-collector outputs of the opto-couplers. As shown, the electrical return path (i.e., "ground") of the transducer in assembly 10 is the engine/airframe and therefore common-mode noise (i.e., alternator return path currents) present on the airframe may appear as offsets added to the output pulse of transducer 20. Such offsets, if not alleviated, may reduce the signal-to-noise ratio of the transducer output pulses proportionally.

However, in the preferred exemplary embodiment, the transducer output pulses are filtered through an additional opto-coupler 22 with its transistor output side powered from the separate power supply 29' (which also powers the micro-controller 24 and interface chip 26). Preferably the power supplies 29, 29' also provide over-voltage and over-current protection (as well as reverse-polarity protection) as an added bonus. As a result, the fuel flow transducer/computer assembly 10 is relatively immune to common mode noise voltages and has a relatively high signal-to-noise ratio.

The current-limiting by power supplies 29, 29' and separated power supply/ground return for circuit components mounted near fuel sources is also desired for safety reasons. For example, if the flexible conductive ground strap between the engine and airframe develops some appreciable resistance (e.g., it becomes loosely attached, corrosion occurs, etc.), then a relatively small gauge ground wire associated with some other circuit may effectively become a lower resistance ground return path for unexpectedly large current. Such has been known to effectively burn up a small wire and start a fire. Thus there is more than one reason to desire the use of separate, current limited, power supply/return circuits in the exemplary embodiment.

Factory-programmed micro-controller 24 reads (i.e., detects and counts) raw incremental fuel flow pulses, received from transducer 20 through opto-coupler 22 (e.g., during interrupts), compensates for the appropriate predetermined K factor (i.e., a customized proportionality calibration factor), calculates fuel flow rate, converts calculated fuel flow rate into a serial stream of RS232 digital data acceptable to GPS signal receiver 40, and outputs the serial stream of data to a suitable voltage level adapter interface 26.

Micro-controller 24, in the preferred exemplary embodiment, also drives LED 28, using flow rate dependent pulse modulation which, upon opening the cowling, indicates to the operator or service person: (a) the presence of power to the fuel flow assembly 10 and (b) the operability of the transducer/micro-computer by blinking of the LED. For higher fuel flow rates LED 28 may blink more rapidly and conversely for lower fuel flow rates LED 28 may blink less rapidly. For example, at engine idle LED 28 may blink about once per second, and as the engine revs up it may blink proportionately more rapidly.

LED 28 is preferably disposed on housing 12 of assembly 10 in the engine compartment where it can be best viewed while the vehicle is at rest, although the engine can be revved to observe changes in fuel flow rates. Alternatively, even with the engine off, one can engage a fuel pump to pressurize the fuel injection system and thus temporarily cause sufficient fuel flow to cause blinking of LED 28 and thus confirm operation of at least transducer 20, opto-coupler 22 and micro-controller 28. This simple troubleshooting capability can be quite advantageous out in the field.

The RS232 interface chip 26 receives lower level (e.g., 3–5 volt) logic level RS232 signals, namely, the serial stream of data output from micro-controller 24. It generates its own higher level (e.g., 7–10 volt) drive voltages and relays the higher level RS232 signals onward to GPS signal receiver 40 at an acceptable voltage level for typical GPS receivers.

The system 10 does not require user calibration (i.e., at installation or any other time), because the assembly of transducer 20, opto-coupler 22, micro-controller 24, etc. is pre-calibrated at the factory (e.g., by pre-programming mico-controller 24 to match the K factor value for the particular transducer 20 included therewith). Although-this means that the transducer alone cannot be easily swapped out in the field, the overall unit assembly 10 can be easily changed out together as a unit in the field. Thus, different fuel flow assemblies 10 are interchangeable—even though there is no need to change out or re-program GPS signal receiver 40 when a particular fuel flow system 10 is substituted for a different one. The K factor of transducer 20 is accounted for by micro-controller 24 in that micro-controller 24 is factory-programmed to take into account the specific K factor of its associated transducer 20.

Figure 3:
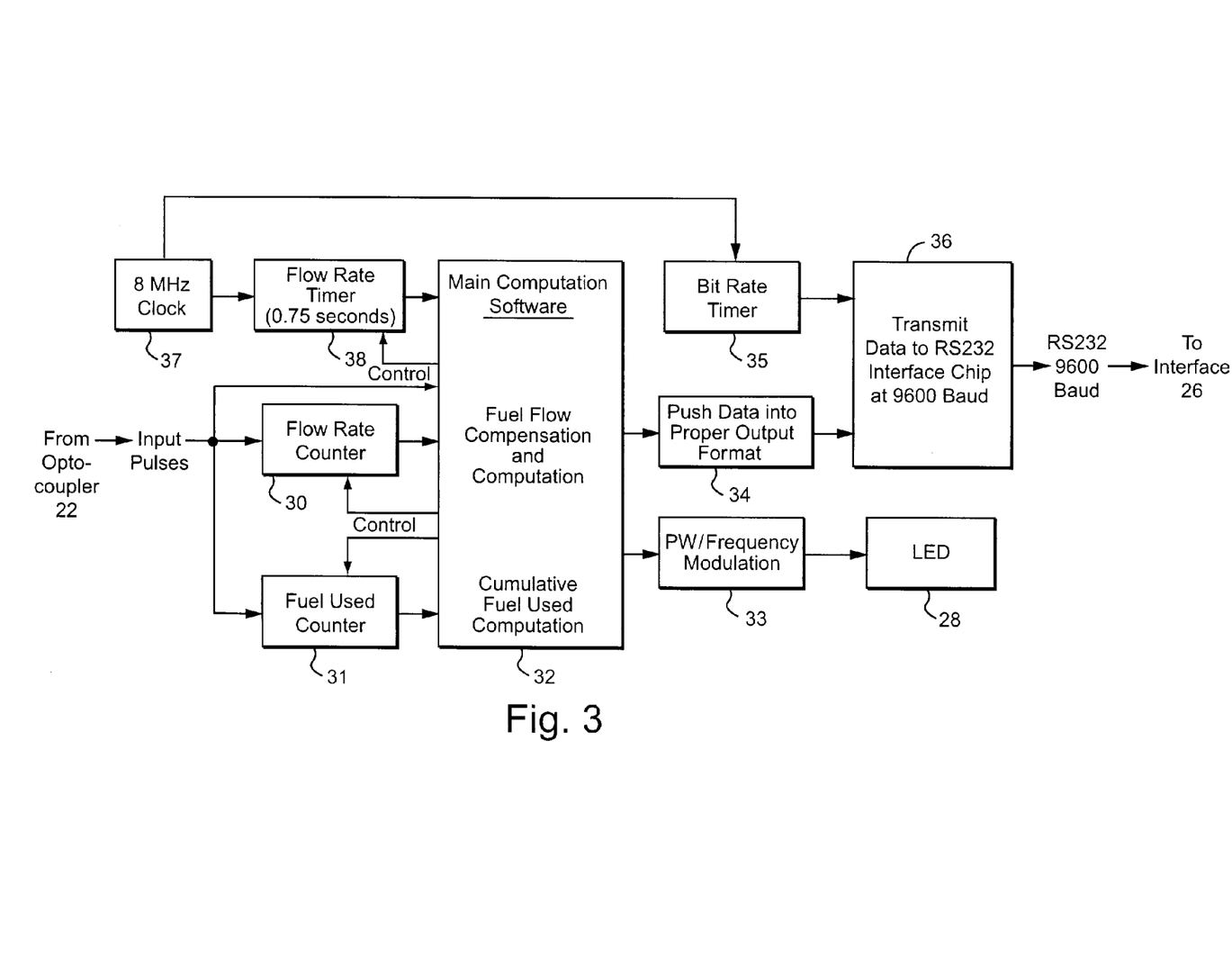
FIG. 3 is an exemplary hardware/software/firmware process flowchart for the micro-controller of FIG. 2.

FIG. 3 depicts a simplified hardware/software/process flowchart for micro-controller 24. For example, flow rate counter 30 and fuel used counter 31 receive pulse data from opto-coupler 22. Data from these counters are used for calculating calibrated (i.e., compensated for K factor) fuel flow and, if desired, fuel used. An 8 MHz clock 37 drives flow rate timer 38 and bit rate timer 35. The calculated digital result is passed to output formatter 34 and to an output pulse width/frequency modulator 33 which drives LED 28. Transmit section 36 receives formatted data from process 34 and from bit rate timer 35 and transmits a (low level) RS232 signal at 9600 baud to interface 26.

In operation, the total fuel used is computed using continuous accumulation of pulses coming from transducer 20 through opto-coupler 22. The fuel flow rate is measured by periodically averaging the fuel quantity represented by 100 pulses (nominal fuel flow rate of 17 gallons/hour produces 30,000 pulses per gallon) per unit time (e.g., once every three-quarters of a second). Micro-controller 24 starts flow rate timer 38, flow rate counter 30 and fuel used counter 31 on the first input pulse from opto-coupler 22, waits about half a second and then stops flow rate counter 30 and flow rate timer 3S on the next pulse received. It then calculates the fuel flow rate using the number of pulses accumulated into flow rate counter 30 and the number of seconds accumulated into flow rate timer 38. Such operations are repeated cyclically to provide a sequence of calculated flow rate values. Conventional averaging techniques may be used to smooth out the calculated fuel flow rate over a moving time window.

In many cases, the GPS unit itself will calculate and display cumulative fuel used based on input fuel flow data. However, it may be desirable (or necessary) to generate and supply such cumulative fuel use data to the GPS unit and thus the preferred exemplary embodiment includes this capability. The value in total fuel used counter 31 is compared against a look-up table and if the fuel used counter value is bigger, then the fuel used counter 31 is reset and the amount of fuel represented by that predetermined value is added to an ongoing accumulation of total fuel used (e.g., as maintained in another memory register counter). The addition is preferably done in a way that eliminates floating-point underflow errors. The accuracy of the fuel flow rate and total fuel used calculations can be around 0.0001% through the use of such floating-point arithmetic. However, the overall accuracy of the exemplary fuel flow system 10 is limited by the accuracy of typical transducers 20 to about 1%.

After the fuel flow rate and total fuel used have been calculated, micro-controller 24 arranges the data into the proper format via an output formatter module 34, and times the data output to interface 26 at 9600 baud via bit rate timer 35 and transmit module 36. The transmission may typically occur every second as requested by GPS signal receiver 40. The 9600 baud rate is typical for most commercially available GPS signal receivers, but the exemplary fuel flow system 10 can support baud rates up to 19200.

During computation and transmission, fuel flow pulses are still always being counted and accumulated (by separate counters 30, 31) so no fuel pulses are lost. The next computation cycle is very similar to the first one. For flow rate calculation, fuel flow counter 30 is reset and new pulse accumulation begins. However, fuel used counter 31 is not necessarily periodically reset (e.g., when its content exceeds some pre-determined total) but may be large enough to just keep adding pulses between re-fueling operations and thus directly provide a cumulative measure of fuel used. Storing all the information in floating-point registers that cannot possibly overflow during a flight eliminates the possibility of integer overflow. Moreover, the typically-required output data format will cause overflow well before the fuel used register would, because in most GPS data formats a 5 digit integer number (99999) is the maximum value that can be transmitted.

The self-contained transducer/computer module 10 provide the user with a simple and efficient way of providing fuel information directly to GPS fuel pages. It does so by eliminating tedious installation and set-up procedures that are required for other fuel flow computers. Just mount module 10 on top of the engine (in series with the engine fuel flow) and electrically connect it to the GPS input power, RS232 input and ground. There is no programmable K factor to set-up, no switches to turn, no jumpers to remove or add.

LED 28 preferably is mounted on a printed circuit board (together with the data processing circuits) contained inside the stainless steel case 12 that contains the Flowscan 201 fuel flow transducer. A proper sized hole is drilled in the case and the LED is pushed half way outside the case so it can easily be viewed from outside. The LED is of high-brightness and wide viewing angle type to make it visible from a couple of feet away. To see the LED, a person should open the cowling and look on top of the engine where the module 10 can typically be mounted.

The GPS typically has the capability to calculate fuel usage per distance traveled, remaining fuel to the next waypoint, etc. The fuel information will show on the fuel pages of the GPS. The GPS has to be setup by the installer (not the manufacturer) to receive the input serial stream. Major GPS manufacturers accept the "format Z" serial communication protocol described below. For example, for a GARMIN 430/530, the GPS should be setup to receive "SHADIN FADC" on serial port 1.

Since even LED 28 is located on case 12, the unit 10 literally takes no panel space. The module 10 does not need user calibration because it contains its own Flowscan 201 transducer and is calibrated (by programming micro-controller 24) at the factory where module 10 is manufactured/assembled. The internal Flowscan 201 transducer cannot be replaced in the field. However, units 10 are interchangeable in the field. The software for each micro-controller 24 changes with the K factor of the Flowscan transducer 20 used in that particular unit 10.

In the presently preferred exemplary embodiment, a different software object code is available for each K factor. When it is time for the software to be loaded, a technician researches the Flowscan K factor for the particular transducer being used in that particular module 10 and loads the appropriate object code into the micro-controller 24 (part of the object code file name may be the K factor; for example for a K factor of 2995 the object code file name could be TF2995.OBJ). The programming is done with the micro-controller on-board so there are no mix-ups. After programming, a computerized test is done to verify that the fuel flow and fuel used is computed correctly. From that point on, the unit is sealed and ready for shipping.

Manufacturers of other fuel flow computers require additional boxes to be installed between the Flowscan transducer (mounted on top of the engine) and the display unit (mounted on the panel, inside the cockpit). However, the present self-contained module 10 is mounted on the engine, the fuel lines connect directly with it, there are no additional boxes required. It is literally: fuel in, digital fuel flow data out.

As noted, "ground problems" are eliminated through the use of separate power supplies, ground connection points and the additional opto-coupler.

Prior fuel flow computers require the installation of a transducer (e.g., the Flowscan 201) on top of the engine connected serially in the fuel supply line and a panel-mount instrument. However, the present module 10 has the Flowscan 201 transducer built-in and connects directly to the GPS. If the power is taken from the GPS connector (and not from the aircraft power bus) then the only electrical connection is with the GPS.

The following is an example of the "computer sentence" RS232 (transmission data format) that is accepted (once every second) by Garmin 400 series GPS signal receivers. This format is referred to as a "Z" format, because it transmits a "Z" character in front of every recognized data value. This format is a fixed sequence bounded by start (STX) and end (ETX) transmission characters. This or similar data transmission formats are used by other GPS manufacturers.

| | |
|---|---|
| STX | |
| ZA012CRLF | ("012" represents indicated air speed - knots) |
| ZB345CRLF | ("345" represents true air speed - knots) |
| ZC678CRLF | ("678" represents Mach speed - thousandths) |
| ZD + 1234CRLF | ("sign1234" represents pressure altitude - tens of feet) |
| ZE + 5678CRLF | ("sign5678" represents density altitude - tens of feet) |
| ZF + 12CRLF | ("sign12" represents outside air temperature - Celsius) |
| ZG + 34CRLF | ("sign34" represents true air temperature - Celsius) |
| ZH567CRLF | ("567" represents wind direction - degrees from North) |
| ZI123CRLF | ("123" represents wind speed - knots) |
| ZJ + 45CRLF | ("sign45" represents rate of return - degrees per second) |
| ZK + 678CRLF | ("sign678" represents vertical speed - tens of feet/minute) |
| ZL123CRLF | ("123" represents heading - degrees from North) |
| ZM4567CRLF | ("4567" represents fuel flow, right - tenths of gallons/hour) |
| ZN1234CRLF | ("1234" represents fuel used, right - tenths of gallons) |
| ZO5678CRLF | ("5678" represents fuel flow, left - tenths of gallons/hour) |

-continued

| | |
|---|---|
| ZP1234CRLF | ("1234" represents fuel used, left - tenths of gallons) |
| ZQ567CRLF | ("567" represents error log/reason indicator) |
| ZR890CRLF | ("890" represents checksum) |
| ETX | |

Figure 4:
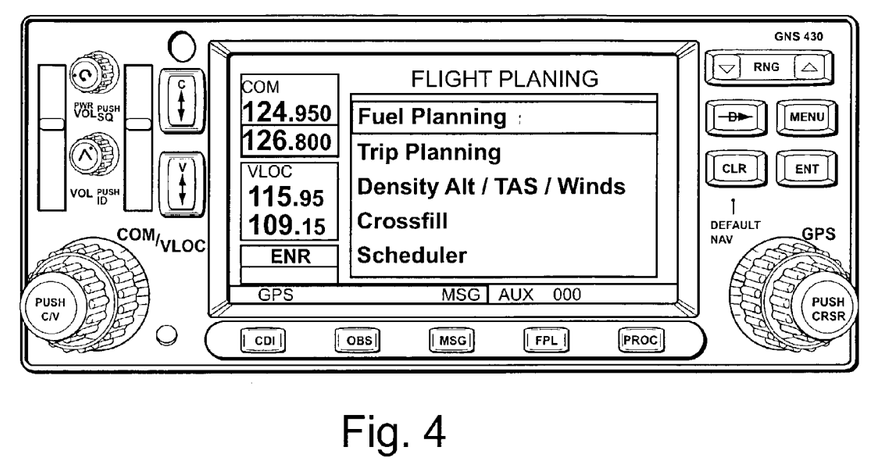
FIGS. 4 and 5 show the fuel page display of an exemplary GPS signal receiver in accordance with an exemplary embodiment of the invention.
Figure 5:
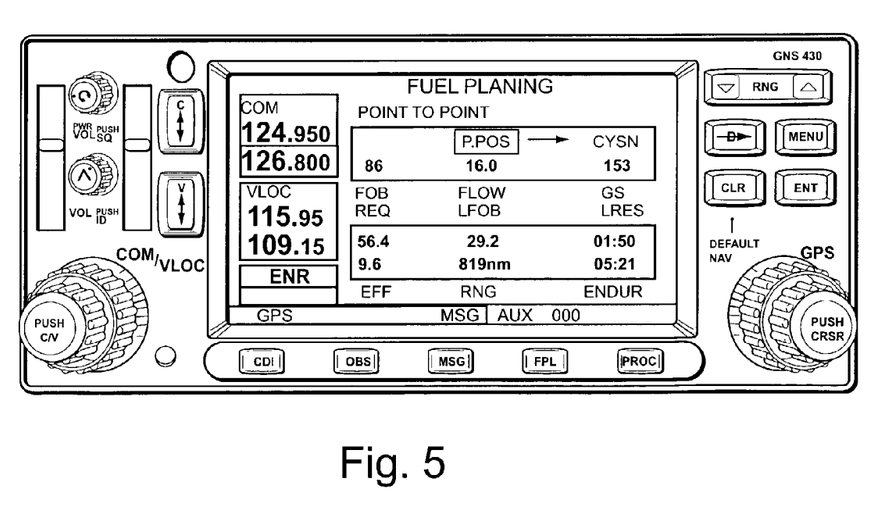

Where:
STX represents a start-transmit character
CR represents a carriage-return character
LF represents a line-feed character
ETX represents an end-transmit character FIGS. 4 and 5 show the fuel flow display pages for the exemplary Garman 430 GPS signal receiver 40 that may be utilized with the exemplary fuel flow system 10. To operate the installed fuel flow computer system on, for example, an aircraft, the pilot turns on GPS signal receiver 40 and then conventionally enters the total fuel on board (FOB) as shown in FIG. 5 (e.g., typically at start-up after a re-fueling operation when a known starting fuel amount is readily available). Immediately thereafter GPS signal receiver 40 will display the fuel flow rate and total fuel used as described above and as shown in FIG. 5 where the display reveals:

| | |
|---|---|
| Fuel on board (FOB) = | 86 gallons |
| Fuel flow (FLOW) = | 16.0 gallons/hour |
| Fuel Required (REQ) = | 56.4 gallons |
| (to go from present position to CYSN) | |
| Left Fuel on Board (LFOB) = | 29.2 gallons |
| Left Reserve Flight Time (LRES) = | 1:50 hours:minutes |
| Fuel Efficiency (EFF) = | 9.6 gallons/nm |
| Range (RNG) = | 819 nm |
| Endurance (ENDUR) = | 5:21 hours:minutes |

The system 10 described above is intended for a single engine powered vehicle. If a multi-engine vehicle (e.g., a twin engine airplane having engines on both the left and right side) is involved, then some modifications will be required to properly display vehicle fuel usage on the GPS receiver.

Figure 6:
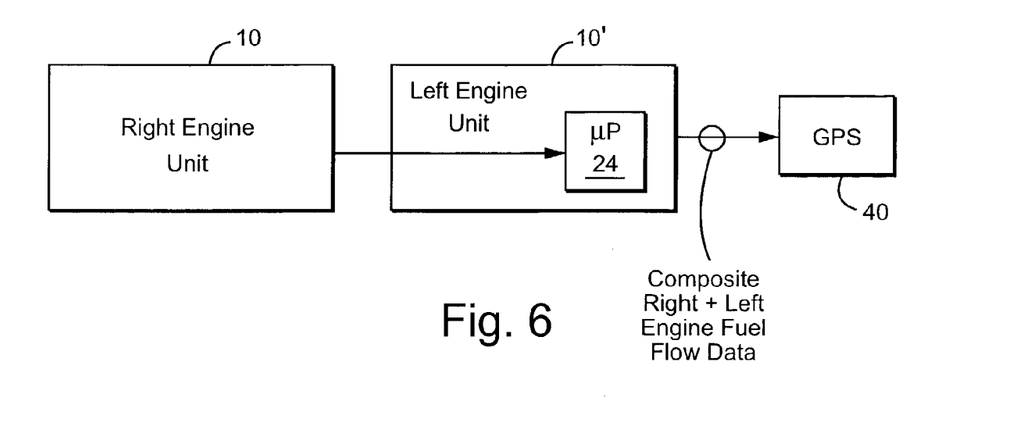
FIGS. 6 and 7 depict exemplary modifications of the exemplary embodiment for installation on multi-engine vehicles.

For example, one may provide micro-controller 24 with an RS232 data input and appropriate software/firmware to add input "Z" format fuel data to the otherwise locally calculated fuel flow data (and possibly cumulative fuel flow if present) before outputting composite RS232 "Z" formatted fuel data. Such a modified fuel flow measuring assembly 10' is depicted in FIG. 6 as receiving data from an unmodified fuel flow measuring assembly 10 so as to produce composite "Z" format fuel data to GPS receiver 40. Of course, any desired plurality N of modified units 10' could be connected together in a daisy-chain fashion to accommodate a corresponding number N of engines.

Figure 7:
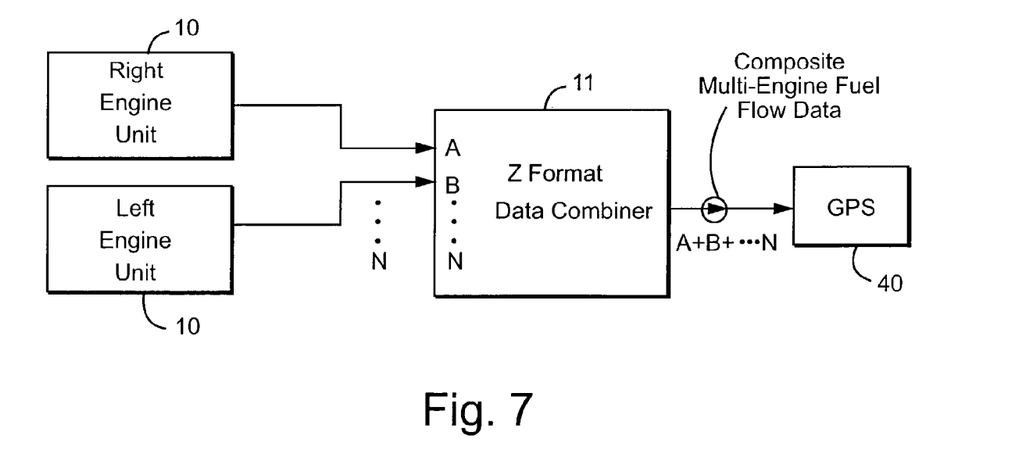

Alternatively, as depicted in FIG. 7, a plurality of unmodified units 10 could have their Z-format fuel data accumulated in an intermediate data combiner 11 before input to a common GPS unit 40. Two such units are depicted in FIG. 7 although, as will be appreciated, any desired number N of such units could be similarly accommodated if the combiner 11 (e.g., a suitably programmed micro-processor) is provided with appropriate connectors and the like.

While the invention has been described in connection with what is presently considered to be preferred exemplary embodiments, it is to be understood that the invention is not to be limited to the disclosed embodiments, but on the contrary, is intended to cover all modifications and equivalent arrangements included within the spirit and scope of the appended claims. It will be understood, for example, that the computing circuits may be implemented entirely in hardware or partly in hardware (micro-processor, micro-controller, hardwired arithmetic and/or gate circuits, etc.) firmware, software, DSP chips, programmed gate arrays, and the like.

What is claimed is:

1. A self-contained fuel flow measuring module for providing vehicular engine fuel flow data, said module comprising:
    a fuel flow transducer and interconnected fuel flow data processing circuits providing fuel flow output data, said transducer and circuits being co-located on a common mounting structure and co-contained within a common housing of the common mounting structure, and the common mounting structure being mountable on a vehicular engine.

2. A fuel flow measuring module as in claim 1 further comprising:
    an opto-coupler disposed between said transducer and said data processing circuits; and
    separate power supplies for said transducer and said data processing circuits.

3. A fuel flow measuring module as in claim 1 further comprising a visual light output indicating whether electrical power is being supplied to the module.

4. A fuel flow measuring module as in claim 3 wherein said data processing circuits are connected to modulate said visual light output as a function of fuel flow transducer output pulses.

5. A fuel flow measuring module as in claim 1 in combination with a GPS receiver connected to receive and display said fuel flow output data.

6. A fuel flow measuring module as in claim 1 wherein said data processing circuits include a data input port adapted to receive input fuel flow data output from another said engine fuel flow measuring module and to combine said input fuel flow data with fuel flow data locally generated therewithin and to output combined fuel flow output data representing combined fuel flow for plural engines.

7. A plurality of fuel flow measuring modules as in claim 1 in combination with a data combining circuit adapted to receive input fuel flow data output from each of said plural modules and to combine said input data into combined fuel flow output data representing combined fuel flow for plural engines.

8. A fuel flow measuring module for providing vehicular engine fuel flow data, said module comprising:
    a fuel flow transducer and interconnected fuel flow data processing circuits providing fuel flow output data, said transducer and circuits being co-located on a common mounting structure;
    wherein:
    said fuel flow transducer is associated with a predetermined calibration constant K, proportional to a number of transducer pulses output for a predetermined quantity of fuel flow therethrough; and
    said data processing circuits have been pre-configured to compensate for said predetermined calibration constant K thus automatically producing calibrated fuel flow output data from said module.

9. A fuel flow measuring module for providing vehicular engine fuel flow data, said module comprising:
    a fuel flow transducer and interconnected fuel flow data processing circuits providing fuel flow output data, said transducer and circuits being co-located on a common mounting structure;
    wherein said common mounting structure comprises a common housing affixed to an engine top mounting bracket so that the transducer and circuits are co-contained within the common housing and the engine top mounting bracket, and the engine top mounting bracket is mountable on a vehicular engine.

10. A fuel flow measuring module as in claim 9 wherein an LED modulated at a fuel flow related rate by said data processing circuits is viewable via an aperture in said housing.

11. A fuel flow measuring module as in claim 10 further comprising an opto-coupler interconnecting said transducer and said data processing circuits.

12. A fuel flow measuring module as in claim 10 further comprising different electrical ground return connection points for said transducer and said data processing circuits.

13. A fuel flow measuring module as in claim 10 further comprising separate electrical power supplies for said transducer and said data processing circuits.

14. A fuel flow measuring module as in claim 13 further comprising different electrical ground return connection points for said transducer and said data processing circuits.

15. A fuel flow measuring module for providing vehicular engine fuel flow data, said module comprising:
    a fuel flow transducer and interconnected fuel flow data processing circuits providing fuel flow output data, said transducer and circuits being co-located on a common mounting structure;
    wherein said common mounting structure comprises a common housing affixed to an engine top mounting bracket;
    an LED modulated at a fuel flow related rate by said data processing circuits is viewable via an aperture in said housing; and
    wherein said housing has apertures in opposite sides for passing input and output fuel lines and has electrical connection wires passing through a side of the housing that is orthogonal to the sides having fuel line apertures.

16. A fuel flow measuring module for providing vehicular engine fuel flow data, said module comprising:
    a fuel flow transducer and interconnected fuel flow data processing circuits providing fuel flow output data, said transducer and circuits being co-located on a common mounting structure;
    wherein said data processing circuits comprise:
    a fuel flow rate calculation period timer register;
    a fuel flow transducer pulse counter register;
    a controller programmed (a) to calculate calibrated fuel flow rate data based on the contents of said timer and counter registers, and (b) to generate and output RS232 digital data characters in a predetermined serial format for inputting said calibrated fuel flow rate data to a GPS receiver.

17. A fuel flow measuring module as in claim 16 wherein said data processing circuits further comprise:
    a cumulative fuel used counter register; and
    wherein said controller is programmed to also generate cumulative fuel used data and to output same within said RS232 digital data characters.

18. An engine fuel flow computer adapted to generate fuel flow data for display on a GPS receiver having fuel display capability, said engine fuel flow computer comprising:
    a fuel flow transducer adapted to sense incremental fuel flow to an engine and to output a corresponding signal; and
    digital signal processing circuits co-located and interconnected with said fuel flow transducer to calculate fuel flow rate to the engine and to output GPS display-controlling signals, said fuel flow computer being pre-calibrated by having a proportionality K factor for said fuel flow transducer pre-programmed into said digital signal processing circuits.

19. A fuel flow computer as in claim 18 wherein said digital circuits comprise a programmed micro-controller and an opto-coupler is disposed to couple signals from said transducer to said micro-controller.

20. A fuel flow computer as in claim 18 further comprising a light emitting diode (LED) co-located and connected to indicate whether the fuel flow computer is being powered.

21. A fuel flow computer as in claim 20 wherein said LED is driven by said digital signal processing circuits so that the LED blinks at a rate proportional to fuel flow rate.

22. A fuel flow computer as in claim 18 wherein said GPS display-controlling signals comprise serial digital character data in a predetermined format recognizable by the GPS signal receiver.

23. A fuel flow computer as in claim 22 wherein said serial digital character data comprises RS232 signals.

24. A fuel flow computer as in claim 19 wherein said co-located transducer and said micro-controller are adapted for mounting to an engine in an engine compartment.

25. A fuel flow computer as in claim 19 wherein said co-located transducer and micro-controller are powered by separate power supplies connected with different ground return circuits so as to reduce otherwise superimposed common-mode noise voltages.

26. A fuel flow display system for displaying fuel flow information to an operator of a vehicle, said system comprising:
    a fuel flow computer disposed in an engine compartment including,
      (a) a fuel flow transducer disposed in said engine compartment and adapted to sense fuel flow to an engine of the vehicle and to output a corresponding representative signal, and
      (b) digital signal processing circuits, also disposed in said engine compartment, adapted to (i) receive the signal output from said fuel flow transducer and, in response thereto, calculate the rate of fuel flow to the engine, and (ii) output display-controlling signals representing fuel flow information, said fuel flow computer being pre-calibrated by having a transducer K factor of proportionality pre-programmed into said digital processing circuits; and
    a GPS signal receiver having fuel display capability disposed outside the engine compartment in view of a vehicle operator and connected to receive said output display-controlling signals from said digital circuits to display fuel flow information.

27. A system as in claim 26 wherein an opto-coupler is also disposed in the engine compartment to couple said transducer to said digital signal processing circuits while providing a separate ground connection isolated from the transducer.

28. A system as in claim 26, further comprising a light emitting diode (LED) connected (a) to indicate whether the system is being powered, and (b) to blink at a rate proportional to the rate of fuel flow to indicate whether the flow transducer is operational.

29. A fuel flow measuring method for providing vehicular engine fuel flow data, said method comprising:
    co-locating a fuel flow transducer and interconnected fuel flow data processing circuits providing fuel flow output data on a common mounting structure in a self-contained compartment so that the transducer and the circuits are co-contained within a common housing of the common mounting structure, the common mounting structure being mountable to a vehicular engine; and
    transmitting said fuel flow output data outside the compartment.

30. A fuel flow measuring method as in claim 29 further comprising:
    opto-coupling pulse signals from said transducer to said data processing circuits; and
    using separate power supplies and electrical return connection points for said transducer and said data processing circuits.

31. A fuel flow measuring method as in claim 29 further comprising providing, in the compartment, a visual light output indicating whether electrical power is being supplied to the module.

32. A fuel flow measuring method as in claim 31 further comprising:
    modulating said visual light output as a function of fuel flow transducer output pulses.

33. A fuel flow measuring method as in claim 29 further comprising:
    inputting said fuel flow output data to a GPS receiver adapted to display said fuel flow output data.

34. A fuel flow measuring method as in claim 29 further comprising
    combining fuel flow data output from a first engine fuel flow measuring module with fuel flow data of a different engine fuel flow measuring module to output combined fuel flow output data representing combined fuel flow for plural engines.

35. A fuel flow measuring method for providing vehicular engine fuel flow data, said method comprising:
    co-locating a fuel flow transducer and interconnected fuel flow data processing circuits providing fuel flow output data on a common mounting structure in an engine compartment; and
    transmitting said fuel flow output data outside the engine compartment;
    wherein said fuel flow transducer is associated with a predetermined calibration constant K, proportional to a number of transducer pulses output for a predetermined quantity of fuel flow therethrough, and further comprising:
    pre-configuring said data processing circuits to compensate for said predetermined calibration constant K thus automatically producing calibrated fuel flow output data.

36. A fuel flow measuring method for providing vehicular engine fuel flow data, said method comprising:
    co-locating a fuel flow transducer and interconnected fuel flow data processing circuits providing fuel flow output data on a common mounting structure in an engine compartment; and
    transmitting said fuel flow output data outside the engine compartment;
    wherein the common mounting structure includes a common housing and an engine top mounting bracket, and said co-located transducer and data processing circuits are disposed in the common housing affixed to the engine top mounting bracket, the engine top mounting bracket being mountable to a vehicular engine.

37. A fuel flow measuring method for providing vehicular engine fuel flow data, said method comprising:

co-locating a fuel flow transducer and interconnected fuel flow data processing circuits providing fuel flow output data on a common mounting structure in an engine compartment; and transmitting said fuel flow output data outside the engine compartment;

wherein said data processing circuits comprise a fuel flow rate calculation period timer register and a fuel flow transducer pulse counter register and said method includes:

(a) calculating calibrated fuel flow rate data based on the contents of said timer and counter registers, and (b) generating and outputting RS232 digital data characters in a predetermined serial format for inputting said calibrated fuel flow rate data to a GPS receiver.

38. A fuel flow measuring method as in claim 37 wherein said data processing circuits further comprise a cumulative fuel used counter register and said method includes:

generating cumulative fuel used data and outputting same within said RS232 digital data characters.

39. A method for displaying fuel flow information on a GPS signal receiver disposed in the cockpit of an airplane, said method comprising:

sensing fuel flow to an engine of the airplane in an engine compartment;

calculating, in said engine compartment, based on said sensed fuel flow, a calibrated rate of fuel flow to said engine of the airplane; and generating, in the engine compartment, calibrated fuel flow rate data and sending it to a data input port of a GPS signal receiver outside the engine compartment in a format that will cause display of such data on the GPS signal receiver.

40. A method as in claim 39, further comprising providing, in the engine compartment, a blinking visual indication that blinks at a rate representative of sensed fuel flow.

41. A method as in claim 39 wherein said calculating includes use of a calibration K factor of proportionality that is predetermined in said calculating step before a system is installed in an airplane to perform said method.

42. A fuel flow measuring module for providing vehicular engine fuel flow data, said module comprising:

a fuel flow transducer and interconnected fuel flow data processing circuits providing fuel flow output data, said transducer and circuits being co-located on a common mounting structure comprising a common housing within which said transducer and circuits are co-located;

wherein said housing has apertures in opposite sides for passing input and output fuel lines and has electrical connection wires passing through a side of the housing.

43. A fuel flow measuring module as in claim 42, wherein the side of the housing through which the electrical connection wires pass is orthogonal to the sides having the fuel line apertures.

* * * * *